United States Patent
Utsunomiya et al.

(10) Patent No.: US 7,336,053 B2
(45) Date of Patent: Feb. 26, 2008

(54) BATTERY-POWERED ELECTRONIC EQUIPMENT WITH CHARGE CONTROL CIRCUIT

(75) Inventors: Fumiyasu Utsunomiya, Chiba (JP); Kazuyoshi Furuta, Chiba (JP); Fumiharu Iwasaki, Chiba (JP); Tsuneaki Tamachi, Chiba (JP); Takafumi Sarata, Chiba (JP); Norimasa Yanase, Chiba (JP)

(73) Assignee: Seiko Instruments Inc. (JP)

( * ) Notice: Subject to any disclaimer, the term of this patent is extended or adjusted under 35 U.S.C. 154(b) by 151 days.

(21) Appl. No.: 10/812,437

(22) Filed: Mar. 30, 2004

(65) Prior Publication Data

US 2004/0207361 A1    Oct. 21, 2004

(30) Foreign Application Priority Data

Mar. 31, 2003 (JP) ............................. 2003-094446
Mar. 9, 2004 (JP) ............................. 2004-065425

(51) Int. Cl.
*H01M 10/46* (2006.01)

(52) U.S. Cl. ..................................... 320/103; 320/166
(58) Field of Classification Search ................ 320/103, 320/104, 134, 136, 140, 166
See application file for complete search history.

(56) References Cited

U.S. PATENT DOCUMENTS

| | | | |
|---|---|---|---|
| 5,784,626 A | * | 7/1998 | Odaohara ................... 713/300 |
| 6,075,331 A | * | 6/2000 | Ando et al. ................. 318/376 |
| 7,023,107 B2 | * | 4/2006 | Okuda et al. .............. 307/10.1 |
| 2003/0169022 A1 | * | 9/2003 | Turner et al. ............... 320/166 |

* cited by examiner

*Primary Examiner*—Edward H Tso
(74) *Attorney, Agent, or Firm*—Adams & Wilks (57) ABSTRACT

An electric equipment has a battery and an electric condenser that has an internal resistance lower than that of the battery and accumulates therein an electric power of the battery. A charge control circuit controls a charge current originating from the electric power of the battery and flowing from the battery to the electric condenser. The charge control circuit controls the charge current in accordance with a self-discharge rate of the battery. A load is driven with the electric power accumulated in the electric condenser.

15 Claims, 4 Drawing Sheets

308, 318 BLEEDER RESISTOR
309 REFERENCE VOLTAGE GENERATION CIRCUIT
319 VOLTAGE LIMIT CIRCUIT

208 BLEEDER RESISTOR

209 REFERENCE VOLTAGE
 GENERATION CIRCUIT

210 VOLTAGE LIMIT CIRCUIT

FIG. 3

308, 318 BLEEDER RESISTOR
309 REFERENCE VOLTAGE
      GENERATION CIRCUIT
319 VOLTAGE LIMIT CIRCUIT

BATTERY-POWERED ELECTRONIC EQUIPMENT WITH CHARGE CONTROL CIRCUIT

BACKGROUND OF THE INVENTION

1. Field of the Invention

The present invention relates in general to equipment which is driven with a battery having a high internal resistance or a secondary battery, and more particularly to equipment which is required to be operated for a long time with the battery or secondary battery.

2. Related Background Art

Figure 4:
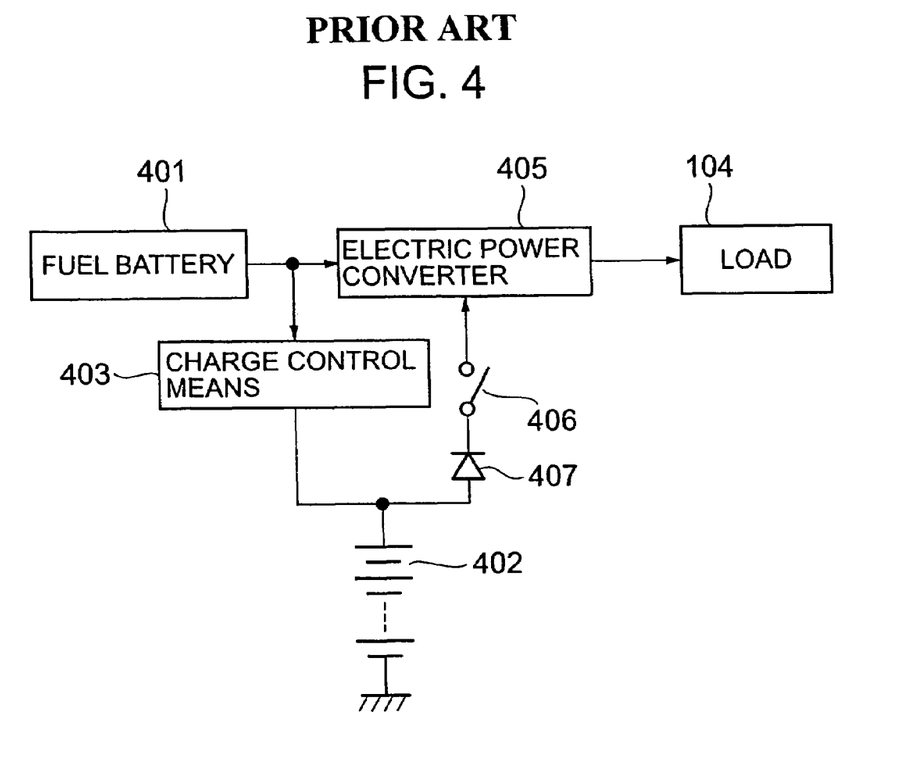
FIG. 4 is a block diagram showing a schematic circuit configuration of conventional equipment.

Conventional equipment is shown in FIG. 4. In FIG. 4, a fuel cell 401 is shown as an example of a battery having a high internal resistance or a secondary battery, and a secondary battery 402 is shown as an example of an electric condenser. As shown in FIG. 4, the equipment includes: the fuel cell 401 for outputting an electric power; a load 104 performing a desired function; the secondary battery 402 for accumulating therein an electric power of the fuel cell 401; a charge control unit 403 for controlling an operation for charging the secondary battery 402 with the electric power of the fuel cell 401; an electric power converter 405 for converting the electric power of the fuel cell 401 and the electric power accumulated in the secondary battery 402 into an electric power with which the load 104 can be operated; and a switch 406 provided in the middle of a path through which the electric power accumulated in the secondary battery 402 is supplied to the electric power converter 405 in order to control a diode 407 for preventing a reverse current from being caused to flow from the electric power converter 405 to the secondary battery 402, and an operation for supplying the electric power accumulated in the secondary battery 402 to the electric power converter 405.

With the above-mentioned configuration, when a quantity of electric power of the fuel cell 401 is more than that required to drive the load 104, the charge control unit 403 charges the secondary battery 402 with an excessive electric power of the fuel cell 401. On the other hand, when a quantity of electric power of the fuel cell 401 is less than that required to drive the load 104, it is possible to make up for a quantity of insufficient electric power with the electric power accumulated in the secondary battery 402 (refer to JP 2002-315224 A (pages 2 and 3, and FIG. 3) for example).

Note that since a voltage of the fuel cell 401 is different from that of the secondary battery 402 in many cases, a DC-DC converter is used as the charge control unit 403.

Figure 5:
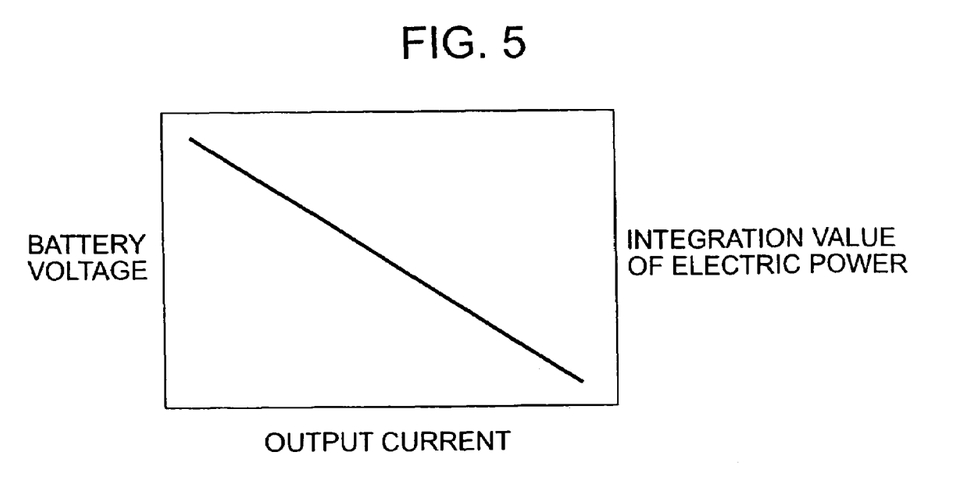
FIG. 5 is a graphical representation showing a relationship between an output current of a battery having a high internal resistance or a secondary battery, and a battery voltage and an integration value of an electric power being obtained.

The above-mentioned conventional equipment is configured so that a maximum electric power is obtained from the fuel cell as the battery having a high internal resistance, and the maximum electric power is used in driving of the load and charging of the secondary battery. In case of adopting of such a configuration, a quantity of current obtained from the fuel cell also becomes large. A problem in the case where a quantity of current obtained from the fuel cell also becomes large as described above will now be described with reference to FIG. 5. FIG. 5 is a graphical representation showing a relationship between an output current from a battery, such as a fuel cell, having a high internal resistance, and a battery voltage and an integration value of an electric power able to be obtained from the battery. As shown in FIG. 5, as the output current is increased, the integration value of the electric power is reduced since the battery voltage is reduced due to a voltage drop developed by causing the output current to flow through the internal resistance of the battery, and an electric power loss is increased due to calorification of the internal resistance of the battery. As a result, in case of the above-mentioned conventional equipment, since a quantity of current obtained from the fuel cell is large, the electric power loss due to flowing of the current through the internal resistance of the fuel cell is increased to reduce the integration value of the electric power able to be obtained from the fuel cell.

That is to say, in case of the configuration of the equipment driven with the battery, such as the above-mentioned conventional fuel cell, having a high internal resistance, there is encountered a problem that since the electric power loss due to calorification of the internal resistance of the battery is increased, the integration value of the electric power able to be obtained from that battery is reduced to shorten an operating time of the equipment.

Recently, the fuel cell has particularly attracted attention owing to its miniature size and large capacity. Thus, an electric automobile, a mobile apparatus, and the like each using a fuel cell have been actively developed. If the above-mentioned problem can be solved, then the realizability of the electric automobile, the mobile apparatus, and the like each driven with the fuel cell will be greatly enhanced.

Incidentally, when the maximum electric power is obtained from the battery having a high internal resistance or the secondary battery, a current has to be obtained from the battery so that a voltage drop due to the internal resistance of the battery becomes about half an open voltage of the battery. In this case, about 50% of the electric power is consumed in the form of calorification of the internal resistance, and hence the integration value of the electric power obtained from the battery is reduced to about half that when a current is hardly obtained from the battery. Consequently, the duration of the above-mentioned conventional equipment is nearly halved.

Figure 6:
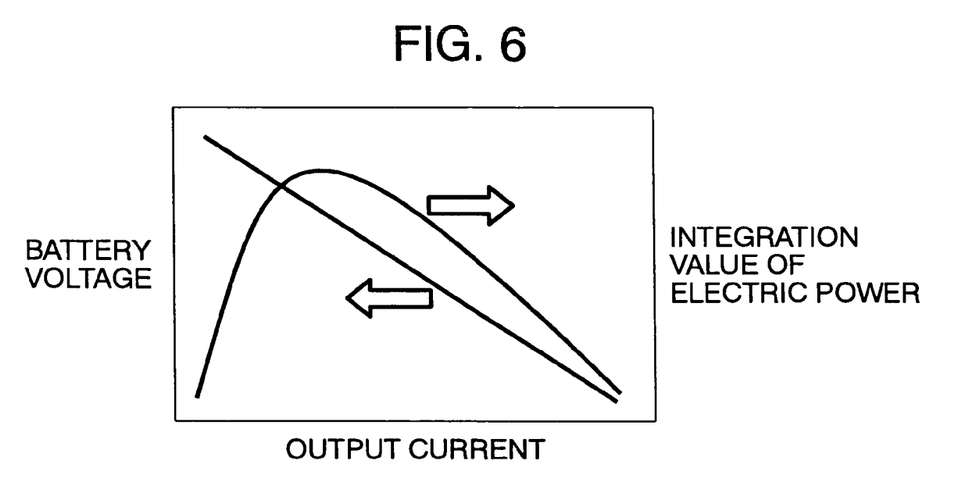
FIG. 6 is a graphical representation showing a relationship between an output current of a battery having a high internal resistance and much self-discharge or a secondary battery, and a battery voltage and an integration value of an electric power being obtained.

In addition, in the fuel cell of a direct methanol system (hereinafter referred to as "a DMFC system" for short when applicable) which has attracted attention recently, a portion of the fuel is lost with time due to methanol crossover without being converted into an electric power. That is to say, the self-discharge is very large. FIG. 6 is a graphical representation showing a relationship between an output current obtained from a battery such as a fuel cell of the DMFC system having large self-discharge and a high internal resistance or a secondary battery, and a battery voltage and an integration value of an electric power able to be obtained from the battery. As shown in FIG. 6, when a quantity of current obtained from the battery is small, the loss due to the self-discharge is increased, while when a quantity of current obtained from the battery is large, the electric power loss is increased due to the calorification of the internal resistance of the battery. Hence, the integration value of the electric power able, to be obtained from the battery becomes maximum at a certain value of the obtained current.

That is to say, in such a battery, if such a current as to make the integration value of the obtained electric power maximum is obtained, then the electric power of the battery can be most efficiently utilized. However, as described above, in case of the configuration of the above-mentioned conventional equipment, there is encountered a problem that since the electric power loss due to the calorification of the internal resistance of the battery is increased, the integration value of the electric power able to be obtained from the battery is reduced to shorten the operating time of the equipment.

SUMMARY OF THE INVENTION

The present invention has been made in order to solve the above-mentioned problems associated with the prior art, and it is, therefore, an object of the present invention to provide electronic equipment which can be operated for a long time by effectively utilizing an electric power from a battery.

According to a first aspect of the present invention, there is provided electric equipment including: a first battery; an electric condenser which has an internal resistance lower than that of the first battery and which serves to accumulate therein an electric power of the first battery; a charge control circuit which controls a charge current originating from the electric power of the first battery and caused to flow from the first battery to the electric condenser; and a load which is driven with the electric power accumulated in the electric condenser, in which the charge control circuit controls the charge current in correspondence to a self-discharge rate of the first battery. More specifically, the charge control circuit controls the charge current so that a battery voltage drop developed across the first battery falls within a range of 5 to 20% of a battery voltage when the first battery is in an open state, whereby it becomes possible to efficiently utilize the electric power from the first battery having a high internal resistance.

In addition, the charge control circuit controls the charge current so that a battery voltage drop developed across the first battery falls within a range of 10 to 40% of the battery voltage when the first battery is in the open state, whereby even when a battery having much self-discharge and a high internal resistance such as a fuel cell of the DMFC system is adopted as the first battery, it becomes possible to efficiently utilize the electric power from the first battery.

According to a second aspect of the present invention, there is provided electric equipment including: a first battery; an electric condenser which has an internal resistance lower than that of the first battery and which serves to accumulate therein an electric power of the first battery; a charge control circuit which controls a charge current originating from the electric power of the first battery and caused to flow from the first battery to the electric condenser; and a load which is driven with the electric power accumulated in the electric condenser, in which the load is driven in a first operation mode or a second operation mode consuming more current than in the first operation mode, and the charge control circuit charges the electric condenser in a first charge control mode with a charge current which is larger than a current consumed when the load is driven in the first operation mode, and is smaller than a current consumed when the load is driven in the second operation mode. As a result, it becomes possible to drive the load for a long time with the miniature first battery.

Moreover, the charge current is controlled so that the battery voltage drop developed across the first battery falls within a range of 5 to 20% of the battery voltage when the first battery is in an open state, whereby it becomes possible to drive the load for a longer time with the miniature first battery.

Also, the charge current is controlled so that the battery voltage drop developed across the first battery falls within a range of 10 to 40% of the battery voltage when the first battery is in the open state, whereby it becomes possible to drive the load for a longer time with the miniature first battery as compared with the case of the first aspect.

The charge control circuit of the above-mentioned first and second means has a DC-DC converter for converting the inputted electric power of the first battery into a conversion electric power having a different voltage, in which a quantity of the conversion electric power of the DC-DC converter is controlled to control the charge current. As a result, it becomes possible to readily configure the above-mentioned charge control circuit.

According to a third aspect of the present invention, in addition to the configuration of the above-mentioned second aspect, the charge control circuit charges the electric condenser in a second charge control mode with a charge current equal to or larger than the current consumed when the load is driven in the second operation mode, and when a quantity of accumulated electric power of the electric condenser exceeds a quantity of desired electric power, the electric condenser is charged in the first charge control mode, and when the quantity of accumulated electric power of the electric condenser is equal to or less than the quantity of desired electric power, the electric condenser is charged in the second charge control mode. As a result, since the electric power of the first battery having a high internal resistance can be efficiently utilized, it becomes possible to operate the equipment driven with the first battery having a high internal resistance for a long time, and also even when a consumed current of the load is larger than an estimated value, the stable operation becomes possible without stopping the operation of the load.

According to a fourth aspect of the present invention, in addition to the configuration of the above-mentioned third aspect, the charge control circuit includes the DC-DC converter having a voltage control function of controlling the conversion electric power so that the voltage of the electric condenser becomes equal to the predetermined voltage, in which the voltage control function operates in the second charge control mode. As a result, the charge control circuit of the above-mentioned third aspect can be readily configured at a low cost.

According to a fifth aspect of the present invention, in addition to the configuration of the above-mentioned third aspect, the DC-DC converter of the charge control circuit includes a first DC-DC converter for controlling the charge current so that the battery voltage drop developed across the first battery becomes a predetermined quantity, and a second DC-DC converter for controlling the charge current so that the voltage of the electric condenser becomes equal to the predetermined voltage, in which in the first charge control mode, the electric condenser is charged using the first DC-DC converter, and in the second charge control mode, the electric condenser is charged using the second DC-DC converter. As a result, the charge control circuit of the third means can be readily configured, and also the electronic equipment can be operated for a longer time with the first battery having a high internal resistance as compared with the case where the charge control circuit of the fourth aspect is used.

According to the present invention, in the equipment which is driven with the electric power of the battery having a high internal resistance or the secondary battery, the equipment can be efficiently driven with the electric power of the battery having a high internal resistance or the secondary battery. Hence, the equipment can be operated for a long time.

DESCRIPTION OF THE PREFERRED EMBODIMENTS

Figure 1:
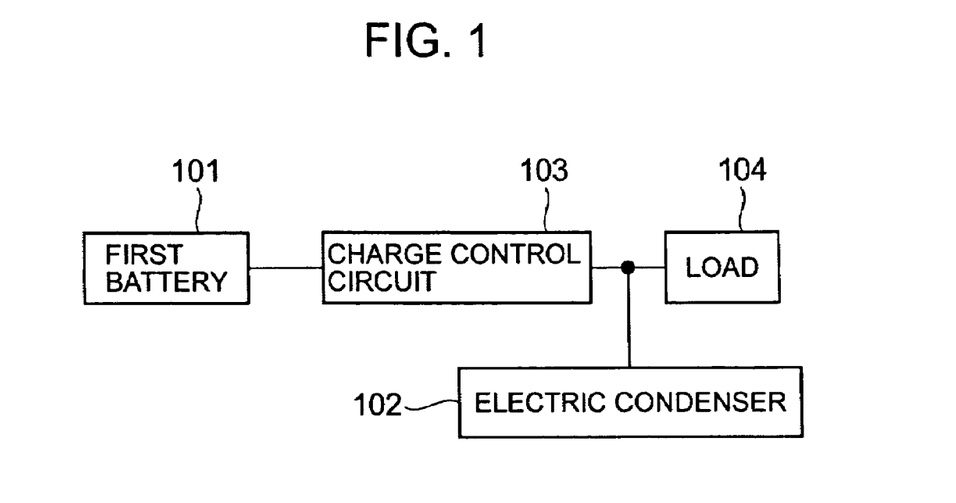
FIG. 1 is a block diagram showing a schematic configuration of equipment according to an embodiment mode of the present invention.

FIG. 1 is a block diagram showing a schematic configuration of equipment according to an embodiment mode of the present invention. The equipment includes: a first battery 101 as a battery having a high internal resistance or a secondary battery; an electric condenser 102 for accumulating therein an electric power of the first battery 101; a charge control circuit 103 for controlling an operation for charging the electric condenser 102 with the electric power of the first battery 101; and a load 104 adapted to be driven with the electric power accumulated in the electric condenser 102.

As the first battery 101, there can be adopted a fuel cell, a lithium polymer secondary battery, a lithium secondary battery, a Ni-cadmium secondary battery, a manganese battery, an alkaline battery, an air battery, a lead secondary battery, or the like. As the electric condenser 102, there can be adopted a Ni-MH secondary battery, a lithium polymer secondary battery, a lithium secondary battery, a Ni-cadmium secondary battery, a lead secondary battery, a ceramic capacitor, an electrical double layer capacitor, a Ta capacitor, an Al electrolytic capacitor, or the like. In this case, a secondary battery or a capacitor having an internal resistance lower than that of the battery adopted for the first battery 101 is necessarily adopted for the electric condenser 102. In particular, the fuel cell has somewhat high internal resistance and its electric charge density is very high, and thus the fuel cell is used as the first battery 101. On the other hand, the Ni-MH secondary battery or the lithium secondary battery is relatively low in internal resistance and high in electric charge density, and thus the Ni-MH secondary battery or the lithium secondary battery is used as the electric condenser 102. In this case, it is possible to realize the very miniature equipment which can be operated for a long time.

As the load 104, there is adopted a load, such as a transmission/reception circuit of a mobile phone, a motor of an electric automobile, or a home electrical machinery and apparatus, which has a first operation mode and a second operation mode in which a consumed current is more than that in the first operation mode. Note that with respect to the first and second operation modes, giving a transmission/reception circuit of a mobile phone as an example, the first operation mode corresponds to a standby state or a power supply turn-OFF state, and the second operation mode corresponds to a transmission/reception state, and giving a motor of an electric automobile as an example, the first operation mode corresponds to a stopping state, and the second operation mode corresponds to a driving state.

The charge control circuit 103 has a first charge control mode and a second charge control mode in which a charged electric power is more than that in the first charge control mode, and monitors the accumulated electric power of the electric condenser 102. When the results of the monitoring indicates that a quantity of accumulated electric power exceeds a desired quantity, the electric condenser 102 is charged with electricity in the first charge control mode. On the other hand, when the results of the monitoring indicates that a quantity of accumulated electric power is equal to or less than the desired quantity, the electric condenser 102 is charged with electricity in the second charge control mode.

The first charge control mode is a charge control mode in which the electric condenser 102 is charged with an electric power more than that having a consumed electric power in the first operation mode of the load 104, and when the first battery 101 hardly has the self-discharge, the electric condenser 102 is charged with electricity while the voltage drop due to an internal resistance of the first battery 101 is kept so as to fall within a range of 5 to 20% of an open voltage of the first battery 101, and when the first battery 101 is a fuel cell of the DMFC system, or the like and hence its self-discharge rate is so large as to be equal to or larger than 10%, the electric condenser 102 is charged with electricity while the voltage drop due to the internal resistance of the first battery 101 is kept so as to fall within a range of 10 to 40% of the open voltage of the first battery 101. On the other hand, the second charge control mode is a charge control mode in which the electric condenser 102 is charged with an electric power equal to or more than the consumed electric power in the second operation mode of the load 104.

If the voltage drop due to the internal resistance of the first battery 101 becomes lower than 5%, then a ratio of the electric power loss in the charge control circuit 103 to the electric power with which the electric condenser 102 is charged becomes large, and hence the electric power loss when the electric power of the first battery 101 is transferred to the electric condenser 102 becomes large. From this reason, the value of 5% is set as a lower limit.

Note that while the electric power of the first battery 101 can be more efficiently utilized as a value of the internal resistance of the first battery is smaller, in general, when the first battery 101 has a small internal resistance, the first battery 101 is scaled up. Consequently, for the first battery 101, assumption is made on a period of time when the load 104 is operated in the second operation mode, and there is selected the first battery 101 having the highest internal resistance in the above-mentioned internal resistance with which a quantity of electric power accumulated in the electric condenser 102 does not become equal to or less than the desired quantity within the assumed period of time. As a result, the configuration of the embodiment mode of the present invention which has been described above can be effectively utilized, and in addition, the first battery 101 can be miniaturized. Therefore it is possible to miniaturize the equipment having the configuration of the embodiment mode of the present invention all the more.

As described above, in the embodiment mode of the present invention, when a period of time when the load 104 is operated in the second operation mode is equal to or shorter than the assumed period of time, the quantity of accumulated electric power of the electric condenser 102 exceeds the desired quantity. Hence, the charge control circuit 103 can efficiently transfer and change the electric power of the first battery 101 having a high internal resistance in the form of the accumulated electric power of the electric condenser 102 having a low internal resistance in the first charge control mode, and the load 104 is driven with the accumulated electric power of the electric condenser 102 having a low internal resistance. As a result, the load 104 can be driven in a state in which the electric power loss due to the internal resistance of the electric condenser 102 is small. Consequently, since the electric power of the first battery 101 having a high internal resistance can be efficiently utilized for driving of the load 104, it is possible to realize that the equipment driven with the electric power of the first battery 101 having a high internal resistance is operated for a long time.

In addition, when a period of time when the load 104 is operated in the second operation mode exceeds the assumed period of time, and hence the accumulated electric power of the electric condenser 102 becomes equal to or less than the desired electric power, the charge control circuit 103 charges the electric condenser 102 with the electric power of the first battery 101 in the second charge control mode. As a result, it is possible to prevent the accumulated electric power of the electric condenser 102 from becoming less than the driving electric power for the load 104. Consequently, it becomes possible to stably operate the equipment driven with the electric power of the first battery 101 having a high internal resistance.

Embodiment 1

Figure 2:
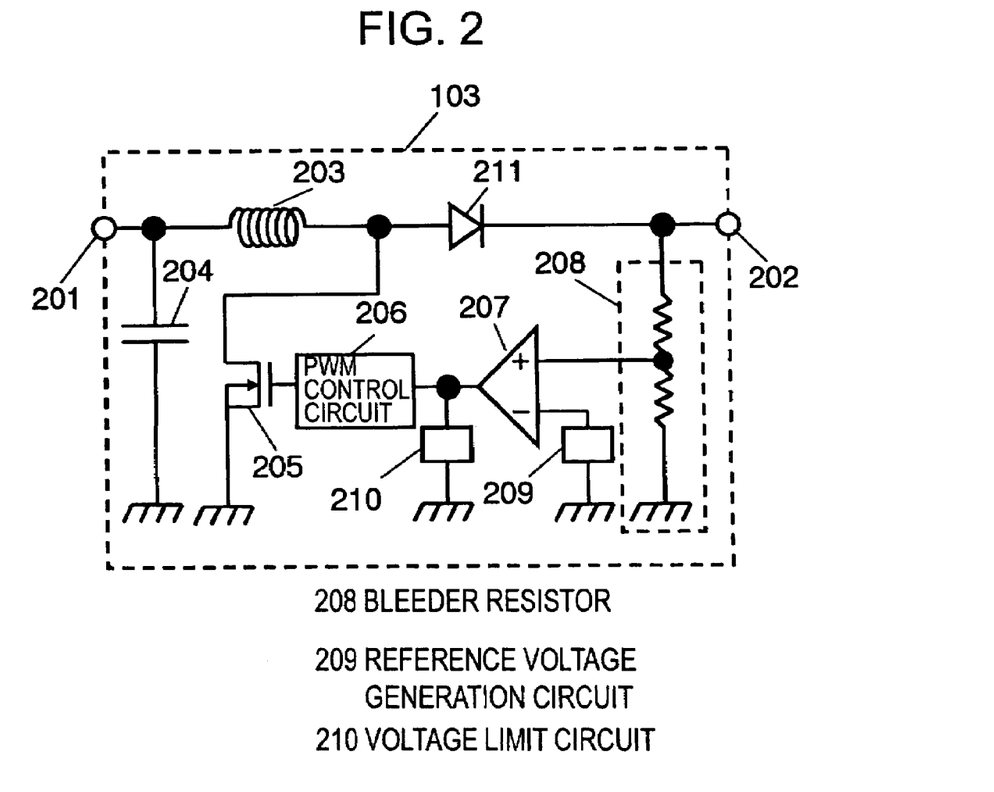
FIG. 2 is a schematic circuit diagram showing Embodiment 1 of an internal configuration of a charge control circuit in the equipment according to the embodiment mode of the present invention.

FIG. 2 is a schematic circuit diagram showing Embodiment 1 of an internal configuration of a charge control circuit in equipment according to the embodiment mode of the present invention. In FIG. 2, there is shown a case where a boosting type DC-DC converter is used since the accumulated voltage of the electric condenser 102 shown in FIG. 1 is higher than the battery voltage of the battery 101 shown in FIG. 1.

The charge control circuit 103 is configured so that: a first terminal of a smoothing capacitor 204 and a first terminal of a boosting coil 203 are connected to an input terminal 201; a first terminal of a diode 211 and a drain terminal of an N-channel MOSFET 205 are connected to a second terminal of the boosting coil 203; an input terminal of a bleeder resistor 208 and an output terminal 202 are connected to a second terminal of the diode 211; an output terminal of the bleeder resistor 208 is connected to a plus side input terminal of an error amplifier 207; a reference voltage output terminal of a reference voltage generation circuit 209 is connected to a minus side input terminal of the error amplifier 207; a limit terminal of a voltage limit circuit 210 and a signal input terminal of a PWM control circuit 206 are connected to an output terminal of the error amplifier 207; a gate electrode of the N-channel MOSFET 205 is connected to a pulse output terminal of the PWM control circuit 206; and a second terminal of the smoothing capacitor 204, a source terminal of the N-channel MOSFET 205, a GND connection terminal of the voltage limit circuit 210, a GND connection terminal of the reference voltage generation circuit 209, and a GND connection terminal of the bleeder resistor 208 are connected to a GND terminal.

The input terminal 201 is a terminal through which the electric power of the first battery 101 shown in FIG. 1 is inputted, and the output terminal 202 is a terminal through which the charge electric power is outputted to the electric condenser 102 shown in FIG. 1. In addition, when a voltage appearing at the first terminal of the diode 211 is higher than that appearing at the second terminal, a current is caused to flow through the diode 205 in a forward direction.

Next, an operation will hereinafter be described. An electric power which is accumulated in the coil 203 while the N-channel MOSFET 205 is kept in a turn-ON state is supplied to the output terminal 202 through the diode 211 while the N-channel MOSFET is kept in a turn-OFF state. The error amplifier 207 outputs a voltage which is obtained by amplifying a voltage difference between a voltage appearing at the output terminal of the bleeder resistor 208 and a voltage appearing at the reference voltage output terminal of the reference voltage generation circuit 209 to the output terminal. Then, the PWM control circuit 206, when the voltage appearing at the output terminal of the error amplifier 207 increases, shortens a period of time when an output pulse to the output terminal is kept at a high level, and when the voltage appearing at the output terminal of the error amplifier 207 drops, lengthens the period of time when the output pulse to the output terminal is kept at a high level. That is to say, if when the voltage appearing at the output terminal 202 is set to a desired voltage, the setting is made so that the voltage at the output terminal of the bleeder resistor 208 becomes equal to that at the reference voltage output terminal of the reference voltage generation circuit, when the voltage at the output terminal 202 becomes lower than the desired voltage, a period of time when the N-channel MOSFET 205 is kept at a turn-ON state is lengthened to increase a quantity of electric power accumulated in the coil 203. Hence, the charge control circuit carries out the control so as to increase the voltage at the output terminal 202. On the other hand, when the voltage at the output terminal 202 becomes higher than the desired voltage, a period of time when the N-channel MOSFET 205 is kept at a turn-ON state is shortened to decrease a quantity of electric power accumulated in the coil 203. Hence, the charge control circuit carries out the control so as to increase the voltage at the output terminal 202. As a result, it is possible to realize the voltage control function of setting the voltage appearing at the output terminal 202 to the desired voltage.

Furthermore, the charge control circuit 103 has a configuration in which a limit circuit 210 for limiting the voltage appearing at the output terminal of the error amplifier 207 is provided at the output terminal of the error amplifier 207. A case where the voltage at the output terminal of the error amplifier 207 is limited by the limit circuit 210 corresponds to the first charge control mode, while a case where the voltage at the output terminal of the error amplifier 207 is not limited by the limit circuit 210 corresponds to the second charge control mode of the voltage control function.

That is to say, in the case where when the voltage at the output terminal of the error amplifier 207 is not limited by the limit circuit 210, the second charge control mode corresponds to an operation mode in which the charge control circuit 103 is operated so that the voltage at the output terminal 202 is controlled to be set to the desired voltage. In addition, in the case where the voltage at the output terminal of the error amplifier 207 is limited by the limit circuit 210, a period of time when the pulse outputted through the output terminal of the PWM control circuit 206 is kept at a high level does not become equal to or shorter than a certain period of time, and also a turn-ON period of time of the N-channel MOSFET 205 does not become shorter than this certain period of time. In other words, even if the voltage at the output terminal 202 exceeds the desired voltage, the turn-ON period of time of the N-channel MOSFET 205 is not shortened any more, and hence the electric power accumulated in the coil 203 for this turn-ON period of time is usually supplied to the output terminal. For this reason, the voltage at the output terminal 202, when the consumed current of the load 104 is not increased, increases fast to exceed the desired voltage. That is to say, the operation mode becomes the first charge control mode in which no voltage control function is operated. Of course, the limit voltage is set so that when the voltage at the output terminal of the error amplifier 207 becomes equal to the limit voltage, the voltage drop across the battery connected to the input terminal falls within a range of 5 to 20% of an open voltage of the battery or within a range of 10 to 40% of the open voltage.

As has been described above, the mere addition of the limit circuit 210 to the output terminal of the error amplifier 207 makes it possible that the charge control circuit 103 shown in FIG. 2 obtains the first and second charge control modes. In other words, the conventional boosting type DC-DC converter using the coil is improved to some extent, whereby the charge control circuit having the function as described above can be obtained readily without involving hardly any cost-up.

Further, in the charge control circuit configured as described above according to the present invention, the output voltage control of the PWM system in which the ON-duty of the N-channel MOSFET does not become equal to smaller than a certain value has been described as an example. However, there may be adopted the output voltage control of a PFM system in which a switching frequency of the N-channel MOSFET does not become equal to or lower than a certain frequency. Or, even in case of the output voltage control of a type in which the PFM system and the ordinary PWM system are changed over to each other, an output electric power has only to be prevented from becoming equal to or lower than a certain value.

In addition, in the charge control circuit configured as described above according to the present invention, the voltage at the output terminal is monitored to thereby monitor a quantity of electric power accumulated in the electric condenser. However, it is to be understood that when there is no correlation between the voltage and the accumulated electric power of the electric condenser, there is used a monitoring method including calculating a quantity of accumulated electric power of the electric condenser on the basis of a quantity of electric power with which the electric condenser is charged and a quantity of consumed electric power of the load.

Moreover, in the charge control circuit configured as described above according to the present invention, the boosting type DC-DC converter with which the output electric power does not become equal to or lower than a certain value has been described as an example. However, in a case where the accumulated voltage of the electric condenser 102 shown in FIG. 1 is lower than the battery voltage of the first battery 101 shown in FIG. 1, there may be used a deboosting type DC-DC converter with which the output voltage does not become equal to or larger than a certain value.

Furthermore, in the charge control circuit configured as described above according to the present invention, the DC-DC converter using the coil has been described as an example. However, a DC-DC converter using a capacitor may be used. In a case where the DC-DC converter using a capacitor is used, a frequency of a switch for switching the capacitor has only to be prevented from becoming equal to or lower than a certain frequency, or a magnification of boosting/deboosting has only to be prevented from becoming equal to or smaller than a certain magnification.

Embodiment 2

Figure 3:
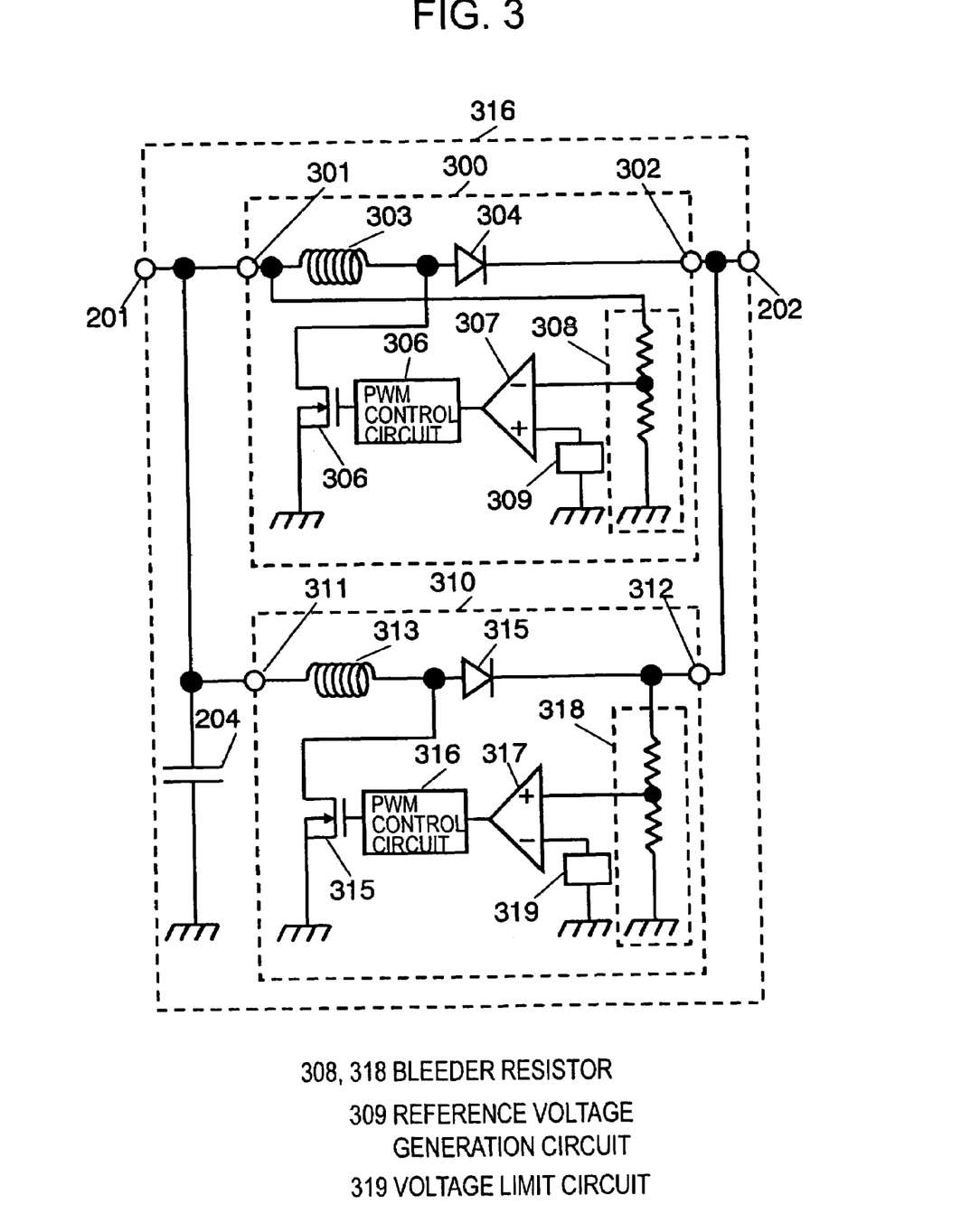
FIG. 3 is a schematic circuit diagram showing Embodiment 2 of an internal configuration of a charge control circuit in the equipment according to the embodiment mode of the present invention.

FIG. 3 is a schematic circuit diagram showing Embodiment 2 of an internal configuration of the charge control circuit in the equipment according to the embodiment mode of the present invention. Since with respect to a relationship between the battery voltage of the battery 101 shown in FIG. 1 and the accumulated voltage of the electric condenser 102 shown in FIG. 1, similarly to the case of FIG. 2, the accumulated voltage of the electric condenser 102 is higher than the battery voltage of the first battery 101 and thus, Embodiment 2 is shown as a case where a boosting type DC-DC converter is used.

A first boosting circuit 300 has a configuration in which the limit circuit 210 and the smoothing capacitor 204 are eliminated from the circuit shown in FIG. 2. A point of difference in connection is as follows. An input terminal 301 is connected to an input terminal of a bleeder resistor 308, an output terminal of a reference voltage generation circuit 309 is connected to a plus side input terminal of an error amplifier 307, and an output terminal of the bleeder resistor 308 is connected to a minus side input terminal of the error amplifier 307.

A second boosting circuit 310 has a configuration in which the limit circuit 210 and the smoothing capacitor 204 are eliminated from the circuit shown in FIG. 2.

In this configuration, the input terminal 301 of the first boosting circuit 300 and an input terminal 311 of the second boosting circuit 310 are connected to the input terminal 201, the output terminal 302 of the first boosting circuit 300 and an output terminal 312 of the second boosting circuit 310 are connected to the output terminal 202, and the smoothing capacitor 204 for smoothing the voltage at the input terminal 201 is connected between the input terminal 201 and GND.

The electric power of the first battery 101 shown in FIG. 1 is inputted to the input terminal 201, and the charge electric power for the electric condenser 102 shown in FIG. 1 is outputted through the output terminal 202.

Next, an operation will hereinafter be described. Since an operation of the second boosting circuit 310 is the same as that when the output signal of the error amplifier having a configuration shown in FIG. 2 is not limited, its description is omitted here for the sake of simplicity.

The input terminal 301 of the first boosting circuit 300 is controlled so that a drop voltage from the battery voltage falls within a range of 5 to 20% of the open voltage of the first battery 101 shown in FIG. 1, or falls within a range of 10 to 40% of that open voltage. The output terminal 312 of the second boosting circuit 310 is controlled so that the voltage appearing at the output terminal 202 becomes equal to the desired voltage.

Consequently, when the voltage at the output terminal 202 is equal to or lower than the desired voltage, the second boosting circuit 310 is operated to control the output terminal 312 so that the voltage at the output terminal 202 becomes equal to the desired voltage. At this time, since the voltage at the input terminal 201 becomes lower than the control voltage of the first boosting circuit 300, the operation of the first boosting circuit 300 is stopped.

Moreover, since the voltage at the output terminal exceeds the desired voltage, the operation of the second boosting circuit 310 is stopped, the voltage at the input terminal 201 becomes equal to or higher than the control voltage of the first boosting circuit 300, and the first boosting circuit 300 is operated to supply the output terminal 202 with the electric power. That is to say, while the first boosting circuit 300 is in operation, the operation of the second boosting circuit 310 is automatically stopped, and while the second boosting circuit 310 is in operation, the operation of the first boosting circuit 300 is automatically stopped. Consequently, there is not required a mechanism for stopping the first boosting circuit 300 or the second boosting circuit 310 using an external signal or the like.

Note that a state in which the first boosting circuit 300 is in operation corresponds to the first charge control mode, while a state in which the second boosting circuit 310 is in operation corresponds to the second charge control mode.

As has been described above, the charge control circuit of the present invention shown in FIG. 3 separately includes the first boosting circuit for charging the electric condenser with the electric power of the first battery while controlling the input terminal of the first boosting circuit so that the drop voltage from the open battery voltage of the first battery falls within the range of 5 to 20% for the first charge control mode, and the second boosting circuit for controlling the output terminal of the second boosting circuit so that the voltage at the output terminal of the charge control circuit becomes equal to the desired voltage to allow the accumulated electric power of the electric condenser to be kept at the desired electric power for the second charge control mode. As a result, since the first boosting circuit can be designed so as to be dedicated to the first charge control mode, and the second boosting circuit can be designed so as to be dedicated to the second charge control mode, the charge losses in the first and second charge control modes can be kept to a minimum. Consequently, since the electric power of the first battery 101 having a high internal resistance can be more efficiently utilized for the driving of the load 104 as compared with the case of the charge control circuit of the present invention shown in FIG. 2, it is possible to realize that the equipment driven with the electric power of the first battery 101 having a high internal resistance is operated for a longer time.

Further, in the charge control circuit of the present invention configured as described above, the first and second boosting circuits have been described by giving the voltage control of the PWM system as an example. However, the voltage control of the PFM system may be adopted, or the voltage control of a type in which the PWM system and the PFM system are switched over to each other may also be adopted. Or, the PWM system may be adopted for the first boosting circuit and the PFM system may be adopted for the second boosting circuit, or the PFM system may be adopted for the first boosting circuit and the PWM system may be adopted for the second boosting circuit.

In addition, in the charge control circuit of the present invention configured as described above, the voltage appearing at the output terminal is monitored to thereby monitor a quantity of accumulated electric power of the electric condenser. However, in a case where there is no correlation between the voltage and the accumulated electric power of the electric condenser, there may also be adopted a monitoring method including calculating a quantity of accumulated electric power of the electric condenser on the basis of a quantity of electric power with which the electric condenser is charged and a quantity of consumed electric power of the load.

Moreover, in the charge control circuit of the present invention configured as described above, the boosting type DC-DC converter has been described as an example. However, in a case where the accumulated voltage of the electric condenser is lower than the battery voltage of the first battery, a deboosting type DC-DC converter may be used.

Furthermore, in the charge control circuit of the present invention configured as described above, the DC-DC converter using the coil has been described as an example. However, a DC-DC converter using a capacitor may be used.

What is claimed is:

1. An electric equipment comprising:
   a battery;
   an electric condenser that has an internal resistance lower than that of the battery and accumulates therein an electric power of the battery;
   a charge control circuit that controls a charge current originating from the electric power of the battery and flowing from the battery to the electric condenser; and
   a load driven with the electric power accumulated in the electric condenser;
   wherein the charge control circuit controls the charge current in accordance with a self-discharge rate of the battery so that a battery voltage drop developed across the battery falls within a range of 5 to 20% of a battery voltage when the battery is in an open state.

2. An electric equipment comprising:
   a battery;
   an electric condenser that has an internal resistance lower than that of the battery and accumulates therein an electric power of the battery;
   a charge control circuit that controls a charge current originating from the electric power of the battery and flowing from the battery to the electric condenser; and
   a load driven with the electric power accumulated in the electric condenser;
   wherein the charge control circuit controls the charge current in accordance with a self-discharge rate of the battery so that a battery voltage drop developed across the battery falls within a range of 10 to 40% of a battery voltage when the battery is in an open state.

3. An electric equipment comprising:
   a battery;
   an electric condenser that has an internal resistance lower than that of the battery and accumulates therein an electric power of the battery;
   a charge control circuit that controls a charge current originating from the electric power of the battery and flowing from the battery to the electric condenser; and
   a load driven with the electric power accumulated in the electric condenser;
   wherein the load is driven in a first operation mode or a second operation mode consuming more current than in the first operation mode; and
   wherein the charge control circuit charges the electric condenser in a first charge control mode with a charge current larger than a current consumed when the load is driven in the first operation mode and with a charge current smaller than a current consumed when the load is driven in the second operation mode.

4. An electric equipment according to claim 3; wherein the charge control circuit controls the charge current so that a battery voltage drop developed across the battery falls within a range of 5 to 20% of the battery voltage when the battery is in an open state.

5. An electric equipment according to claim 3; wherein a self-discharge rate of the battery is equal to or larger than 10%; and wherein the charge control circuit controls the charge current so that a battery voltage drop developed across the battery falls within a range of 10 to 40% of the battery voltage when the battery is in an open state.

6. An electric equipment according to claim 3; wherein the charge control circuit has a DC-DC converter for converting the electric power of the battery inputted into a conversion electric power having a different voltage; and wherein a quantity of the conversion electric power of the DC-DC converter is controlled to control the charge current.

7. An electric equipment according to claim 3; wherein the charge control circuit charges the electric condenser in a second charge control mode with a charge current equal to or larger than the current consumed when the load is driven in the second operation mode; wherein when a quantity of accumulated electric power of the electric condenser exceeds a quantity of desired electric power, the electric condenser is charged in the first charge control mode; and wherein when the quantity of accumulated electric power of the electric condenser is equal to or less than the quantity of desired electric power, the electric condenser is charged in the second charge control mode.

8. An electric equipment according to claim 7; wherein a voltage of the electric condenser becomes equal to a predetermined voltage so that the quantity of accumulated electric power of the electric condenser becomes equal to the quantity of desired electric power.

9. An electric equipment according to claim 8; wherein the charge control circuit has a DC-DC converter for converting the electric power of the battery into a conversion electric power having a different voltage; and wherein a quantity of the conversion electric power of the DC-DC converter is controlled to control the charge current.

10. An electric equipment according to claim 9; wherein the DC-DC converter includes a voltage control function of controlling the conversion electric power so that the voltage of the electric condenser becomes equal to the predetermined voltage; and wherein the voltage control function operates in the second charge control mode.

11. An electric equipment according to claim 9; wherein the DC-DC converter includes a first DC-DC converter for controlling the charge current so that a battery voltage drop developed across the battery becomes a predetermined amount, and a second DC-DC converter for controlling the charge current so that the voltage of the electric condenser becomes equal to the predetermined voltage; and wherein in the first charge control mode, the electric condenser is charged using the first DC-DC converter, and in the second charge control mode, the electric condenser is charged using the second DC-DC converter.

12. An electric equipment comprising:
a battery;
an electric condenser that has an internal resistance lower than that of the battery and accumulates therein an electric power of the battery;
a charge control circuit that controls a charge current originating from the electric power of the battery and flowing from the battery to the electric condenser; and
a load driven with the electric power accumulated in the electric condenser;
wherein the charge control circuit controls the charge current in accordance with a self-discharge rate of the battery and has a first charge control mode that controls the charge current with a first charged electric power and a second charge control mode that controls the charge current with a second charged electric power greater than the first charged electric power; and
wherein the charge control circuit monitors a quantity of electric power accumulated by the electric condenser so that when the quantity of electric power accumulated by the electric condenser exceeds a preselected quantity, the charge control circuit controls the charge current to the electric condenser in the first charge control mode, and when the quantity of electric power accumulated by the electric condenser is less than or equal to the preselected quantity, the charge control circuit controls the charge current to the electric condenser in the second charge control mode.

13. An electric equipment comprising:
a battery;
an electric condenser that has an internal resistance lower than that of the battery and accumulates therein an electric power of the battery;
a charge control circuit that controls a charge current originating from the electric power of the battery and flowing to the electric condenser so that when a self-discharge of the battery is less than 10%, a battery voltage drop across the battery falls within a range of 5% to 20% of a battery voltage when the battery is in an open state, and so that when the self-discharge of the battery is equal to or larger than 10%, the battery voltage drop of the battery falls within a range of 10% to 40% of the battery voltage when the battery is in the open state; and
a load driven with the electric power accumulated in the electric condenser.

14. An electric equipment according to claim 13; wherein the charge control circuit has a DC-DC converter for converting the electric power of the battery into a conversion electric power having a different voltage; and wherein a quantity of the conversion electric power of the DC-DC converter is controlled to control the charge current.

15. An electric equipment according to claim 13; wherein the battery comprises a fuel cell; and wherein the electric condenser comprises a Ni-MR secondary battery or a lithium secondary battery.

* * * * *